(12) United States Patent
Fukumoto et al.

(10) Patent No.: US 10,406,626 B2
(45) Date of Patent: Sep. 10, 2019

(54) RESISTANCE SPOT WELDING METHOD AND WELDED STRUCTURE

(71) Applicant: NIPPON STEEL & SUMITOMO METAL CORPORATION, Tokyo (JP)

(72) Inventors: Manabu Fukumoto, Tokyo (JP); Hitomi Nishibata, Tokyo (JP); Masanori Yasuyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 14/917,281

(22) PCT Filed: Aug. 26, 2014

(86) PCT No.: PCT/JP2014/072280
§ 371 (c)(1),
(2) Date: Mar. 8, 2016

(87) PCT Pub. No.: WO2015/037432
PCT Pub. Date: Mar. 19, 2015

(65) Prior Publication Data
US 2016/0214202 A1    Jul. 28, 2016

(30) Foreign Application Priority Data

Sep. 12, 2013 (JP) ................ 2013-189305

(51) Int. Cl.
*B23K 11/11* (2006.01)
*B23K 11/16* (2006.01)
(Continued)

(52) U.S. Cl.
CPC ............. *B23K 11/115* (2013.01); *B23K 11/14* (2013.01); *B23K 11/16* (2013.01); *B23K 11/34* (2013.01);
(Continued)

(58) Field of Classification Search
CPC .... B23K 11/115; B23K 11/16; B23K 2203/04
(Continued)

(56) References Cited

U.S. PATENT DOCUMENTS 1,933,484 A * 10/1933 Ragsdale ............... B23K 11/115
109/85
5,304,769 A * 4/1994 Ikegami ............. B23K 35/0205
219/119
(Continued)

FOREIGN PATENT DOCUMENTS

JP        07-178563      7/1995
JP        09-99379       4/1997
(Continued)

OTHER PUBLICATIONS

JP 2009279597A English translation.pdf.*

*Primary Examiner* — Dana Ross
*Assistant Examiner* — Ket D Dang
(74) *Attorney, Agent, or Firm* — Clark & Brody (57) ABSTRACT

A overlapped body 10 comprising steel plates 1a and 1b and satisfying (TS1×t1+TS2×t2)/(t1+t2)≥440 is energized while being sandwiched and pressed by a pair of electrodes 2a and 2b to form a molten pool 4b at a steel plate interface 4 and thereby to join the steel plates 1a and 1b. TS1 represents the tensile strength (MPa) of the steel plate 1a, t1 represents the thickness (mm) of the steel plate 1a, TS2 represents the tensile strength (MPa) of the steel plate 1b, and t2 represents the thickness (mm) of the steel plate 1b. An energization point 4a is formed at the steel plate interface 4, and spot welding is performed such that the molten pool 4b is formed at a position at a horizontal distance W of 20 mm or less from the energization point 4a.

4 Claims, 4 Drawing Sheets

(51) Int. Cl.
  *B23K 11/14* (2006.01)
  *B23K 11/34* (2006.01)
  *B23K 101/00* (2006.01)
  *B23K 101/18* (2006.01)
  *B23K 103/04* (2006.01)

(52) U.S. Cl.
  CPC .... *B23K 2101/006* (2018.08); *B23K 2101/18* (2018.08); *B23K 2103/04* (2018.08)

(58) Field of Classification Search
  USPC ........ 219/91.2, 117.1, 118, 69.15, 84, 78.01, 219/86.1, 86.22, 86.25, 119, 780, 120, 93, 219/68, 85.18, 92; 148/320
  See application file for complete search history.

(56) References Cited

U.S. PATENT DOCUMENTS

| | | | | |
|---|---|---|---|---|
| 8,058,584 B2* | 11/2011 | Miyamoto | ............ | B23K 11/115 219/117.1 |
| 2011/0233173 A1* | 9/2011 | Kaneko | ................ | B23K 11/002 219/83 |
| 2012/0055904 A1* | 3/2012 | Sakai | ...................... | B23K 11/11 219/119 |
| 2012/0141829 A1* | 6/2012 | Oikawa | ................. | B23K 11/115 428/683 |
| 2012/0248086 A1* | 10/2012 | Watanabe | ............ | B23K 11/115 219/162 |
| 2013/0337284 A1* | 12/2013 | Onda | .................... | B23K 11/115 428/594 |

FOREIGN PATENT DOCUMENTS

| | | | | |
|---|---|---|---|---|
| JP | 11-104849 | 4/1999 | | |
| JP | 2000-141054 | 5/2000 | | |
| JP | 2003-236674 | 8/2003 | | |
| JP | 2009-279597 | 12/2009 | | |
| JP | 2009279597 A | * 12/2009 | ............ | B23K 11/11 |
| JP | 2010-172945 | 8/2010 | | |
| JP | 2010-207909 | 9/2010 | | |
| JP | 2010207909 A | * 9/2010 | ............ | B23K 11/11 |
| JP | 2010-247215 | 11/2010 | | |
| JP | 2012-076125 | 4/2012 | | |
| JP | 2013-035063 | 2/2013 | | |
| WO | 2012/120351 | 9/2012 | | |

* cited by examiner

RESISTANCE SPOT WELDING METHOD AND WELDED STRUCTURE

TECHNICAL FIELD

The present invention relates to a resistance spot welding method suitable to join two steel plates, and a welded structure obtained by the resistance spot welding method.

BACKGROUND ART

In recent years, in a welding step of welding automotive components or the like, a resistance spot welding method is widely used in which two steel plates are overlapped and then sandwiched by a pair of electrodes, and the overlapped body is then energized while being pressed so as to form a molten pool (usually called "nugget") at an interface between the steel plates and thereby to join the steel plates.

Figure 4:
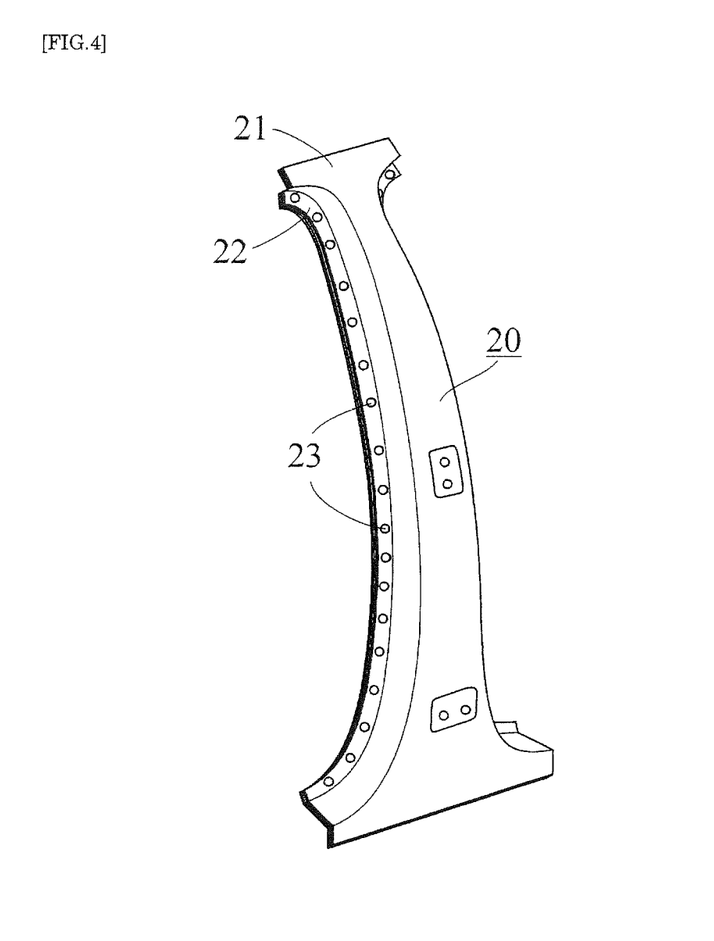
FIG. 4 is a diagram showing the structural members of a door opening portion of an automobile.

For example, a door opening portion of an automobile includes, as structural members, a pillar and a roof rail. A pillar 20 (see, for example, FIG. 4) includes an overlapped body 21 in which, for example, two steel plates are overlapped. As shown in FIG. 4, the overlapped body 21 is joined by forming weld portions 23 at a predetermined interval by spot welding in a flange 22 of the overlapped body 21.

As the overlapped body described above, various combinations (hereinafter referred to as "plate combinations") can be conceived by selecting the material of the two steel plates. At the time of performing resistance spot welding, the welding pressure (pressing force) and the amount of energization are set so as to be appropriate for each plate combination. With some plate combinations, it may be difficult to attain a sufficient range (hereinafter referred to as "proper current range") of welding current (hereinafter referred to as "proper current") that can provide a sound nugget without causing erosion called expulsion and surface flash (also called spatter, splash or the like). As used herein, "sound nugget" refers to a nugget having a sufficiently large molten pool and exhibiting a sufficient joint strength in a tensile test or the like using a joined body (joint). "Sufficiently large molten pool" refers to a molten pool having a diameter larger than, for example, $4\sqrt{t}$ (mm) (where t is the thickness (mm) of the thinner one of the two steel plates constituting a plate combination). The proper current range is determined based on the conditions determined by equipment and production constraints or the like (combined conditions of welding pressure and energization time), and can be determined as the difference between the upper limit value of the proper current (hereinafter referred to as "upper limit current") and the lower limit value of the proper current (hereinafter referred to as "lower limit current"). It is generally believed that the proper current range is desirably wide because stable welding quality can be attained even if disturbance (current fluctuations and the wear of electrode tip or the like) occurs during welding.

Generation of the expulsion and surface flash during welding will degrade the work environment and will cause a reduction in product quality with adhesion of spatters onto the product surface. Furthermore, if an excessively large amount of the expulsion and surface flash is generated, the volume of a fusion joined portion will decrease, which significantly reduces the joint strength in the joined portion. For the reasons given above, it is considered desirable to suppress the generation of the expulsion and surface flash to the extent possible.

Under the circumstances, Patent Documents 1, 2, 3 and 4 disclose techniques for increasing the diameter of nuggets while suppressing the generation of the expulsion and surface flash by improving the conformance (contact state) of the contact plane between steel plates so as to attain a sufficient contact area during energization. These techniques can be construed as techniques that can raise the upper limit current.

Patent Document 5 discloses a technique for increasing the area of a corona bond (a ring shaped portion formed around a nugget by solid state welding, see JIS Z 3001-6 2013) by pressing the periphery of a contact portion between a spot welding electrode and a material to be welded by an insulation indenter. Patent Document 5 teaches that as a result of increasing the area of a corona bond, the same effects as those obtained by increasing the nugget diameter can be obtained. This technique can be construed as a technique that can prevent the generation of the expulsion and surface flash by suppressing the welding current to a low level.

In a welding step of welding automotive components or the like with the use of resistance spot welding, generally, a plurality of welding spots are provided consecutively at locations required from the design point of view. Accordingly, when resistance welding is performed at a given location, if there already is a welding spot near the location (hereinafter referred to as "existing welding spot"), a branch current that flows through the existing welding spot as an energization path is generated. Another case is also conceived in which an energization path is formed at a location other than the existing welding spot and a branch current is generated depending on the geometric shape of members and the arrangement of space with another member. As described above, if the welding current is branched at the time of welding, formation of the molten pool is delayed and thus a sound nugget cannot be obtained. The branch current is also called reactive current, and various investigations have been made on the method for limiting the influence thereof.

For example, Patent Document 6 discloses an invention in which a reactive current is calculated and a current that is increased by an amount corresponding to the calculated reactive current is set as a welding current. Patent Document 7 discloses a method for obtaining a sound nugget by forming a slit so as to reduce the influence of reactive current.

LIST OF PRIOR ART DOCUMENTS

Patent Documents

Patent Document 1: JP H11-104849A
Patent Document 2: JP 2003-236674A
Patent Document 3: JP 2010-207909A
Patent Document 4: JP 2010-247215A
Patent Document 5: JP H07-178563A
Patent Document 6: JP H09-99379A
Patent Document 7: JP 2009-279597A

DISCLOSURE OF THE INVENTION

Problems to be Solved by the Invention

All of the techniques disclosed in Patent Documents 1 to 4 require the welding pressure and/or the amount of energization used at the time of welding to be changed twice or more during welding, and thus are problematic in that the setting and management of the proper current range are complex. The technique disclosed in Patent Document 5 is problematic in that it requires an insulation indenter in addition to spot welding electrodes, which makes the structure of the welder complex.

In the case of performing spot welding on a plate combination composed of two mild steel plates, a sufficient contact area between steel plates can be attained without performing a special step. Accordingly, the generation of the expulsion and surface flash as described above is unlikely to occur. In contrast, in the case of performing spot welding on a plate combination including high-tensile strength steel plates, the probability of generation of the expulsion and surface flash increases. The present inventors contemplated the cause of such a phenomenon as follows. Specifically, in a plate combination including high-tensile strength steel plates, it may not be possible to attain a sufficient contact area at the contact interface between steel plates during welding. In this case, resistive heating becomes excessively large at the contact interface between steel plates, and the expulsion and surface flash is likely to be generated. With this phenomenon, in the plate combination including high-tensile strength steel plates, it may become difficult to sufficiently increase the value of the current in which the expulsion and surface flash has been generated (upper limit current) with respect to the lower limit current. In other words, it may become difficult to attain a sufficient proper current range. In this case, it is difficult to form a molten pool having a sufficiently large size while suppressing the generation of the expulsion and surface flash. In this regard, the present inventors further conducted detailed investigations and found out that it is difficult to attain a sufficient proper current range when spot welding is performed on a plate combination that is composed of two steel plates (hereinafter referred to as "first steel plate" and "second steel plate") and that satisfies the following equation (i) while sandwiching the plate combination by a pair of electrodes, $$(TS1 \times t1 + TS2 \times t2)/(t1 + t2) \geq 440 \qquad (i),$$

In the equation (i), TS1 represents the tensile strength (MPa) of the first steel plate, t1 represents the thickness (mm) of the first steel plate, TS2 represents the tensile strength (MPa) of the second steel plate, and t2 represents the thickness (mm) of the second steel plate.

Patent Documents 6 and 7 disclose methods for cancelling the reactive current. However, these patent documents do not disclose conditions for attaining a sufficient proper current range when spot welding is performed on a plate combination that satisfies the above equation (i) while sandwiching the plate combination by a pair of electrodes. Patent Document 7 shows an example in which spot welding was performed on a SPCC and a 60 k precipitation steel plate in Table 1, and an example in which spot welding was performed on 60 k precipitation steel plates in Table 2. However, the example of Table 1 described above is not an example in which welding was performed on a plate combination that satisfies the above equation (i). Likewise, the example of Table 2 described above is an example in which welding was performed on a plate combination by performing spot welding on one side thereof, and thus is not an example in which spot welding was performed by sandwiching the plate combination by a pair of electrodes.

The present invention has been made to solve the problems described above. Specifically, it is an object of the present invention to provide a resistance spot welding method with which it is possible to form a molten pool having a sufficiently large size while suppressing the generation of the expulsion and surface flash at the time of welding steel plates without requiring the welding pressure and/or the amount of energization used at the time of welding to be changed twice or more during welding and without making the structure of the welder complex, and a welded structure obtained by the resistance spot welding method.

Means for Solving the Problems

The present invention is intended to provide a resistance spot welding method and a welded structure that are described below.

(1) A resistance spot welding method in which an overlapped body that consists of a first steel plate and a second steel plate and that satisfies the following equation (i) is energized while being sandwiched and pressed by a pair of electrodes so as to form a molten pool at an interface between the steel plates and thereby to join the steel plates, the method including: a preliminary step of forming an energization point at the interface between the steel plates by energizing the overlapped body while sandwiching and pressing the overlapped body by the pair of electrodes; and a welding step of performing spot welding so as to form the molten pool at a position at a horizontal distance of 20 mm or less from the energization point, $$(TS1 \times t1 + TS2 \times t2)/(t1 + t2) \geq 440 \qquad (i)$$

where TS1 represents a tensile strength (MPa) of the first steel plate, t1 represents a thickness (mm) of the first steel plate, TS2 represents a tensile strength (MPa) of the second steel plate, and t2 represents a thickness (mm) of the second steel plate.

It is sufficient that the energization point has a small resistance enough to obtain a sufficient branch current, and the energization point may be an energization point at which the interface is fusion joined or an energization point at which the interface is not fused and is thus in a press contact state. As used herein, "press contact" does not mean "pressure welding", but rather means a state in which steel plates are in contact with each other while being pressed against each other.

(2) The resistance spot welding method according to (1) described above, further including a subsequent step of repeatedly performing spot welding such that a new molten pool is formed at a position at a horizontal distance of 20 mm or less from the energization point or the molten pool.

(3) A welded structure obtained by the method according to (1) or (2) described above.

Advantageous Effects of the Invention

According to the present invention, when resistance spot welding is performed on an overlapped body composed of two steel plates, it is possible to form a molten pool having a sufficiently large size while suppressing the generation of the expulsion and surface flash at the interface between the steel plates without changing the welding pressure and/or the amount of energization used at the time of welding twice or more during welding and without making the structure of the welder complex. In addition, if the overlapped body is, for example, a long automotive structural member, with the present invention in which weld portions are consecutively formed in the lengthwise direction, it is possible to obtain a high-strength structural member.

MODE FOR CARRYING OUT THE INVENTION

Hereinafter, a resistance spot welding method according to the present invention will be described. The resistance spot welding method according to the present invention is used when an overlapped body that consists of a first steel plate and a second steel plate and that satisfies the following equation (i) is spot welded, $$(TS1 \times t1 + TS2 \times t2)/(t1 + t2) \geq 440 \qquad (i).$$

In the equation (i), TS1 represents the tensile strength (MPa) of the first steel plate, t1 represents the thickness (mm) of the first steel plate, TS2 represents the tensile strength (MPa) of the second steel plate, and t2 represents the thickness (mm) of the second steel plate.

Figure 1:
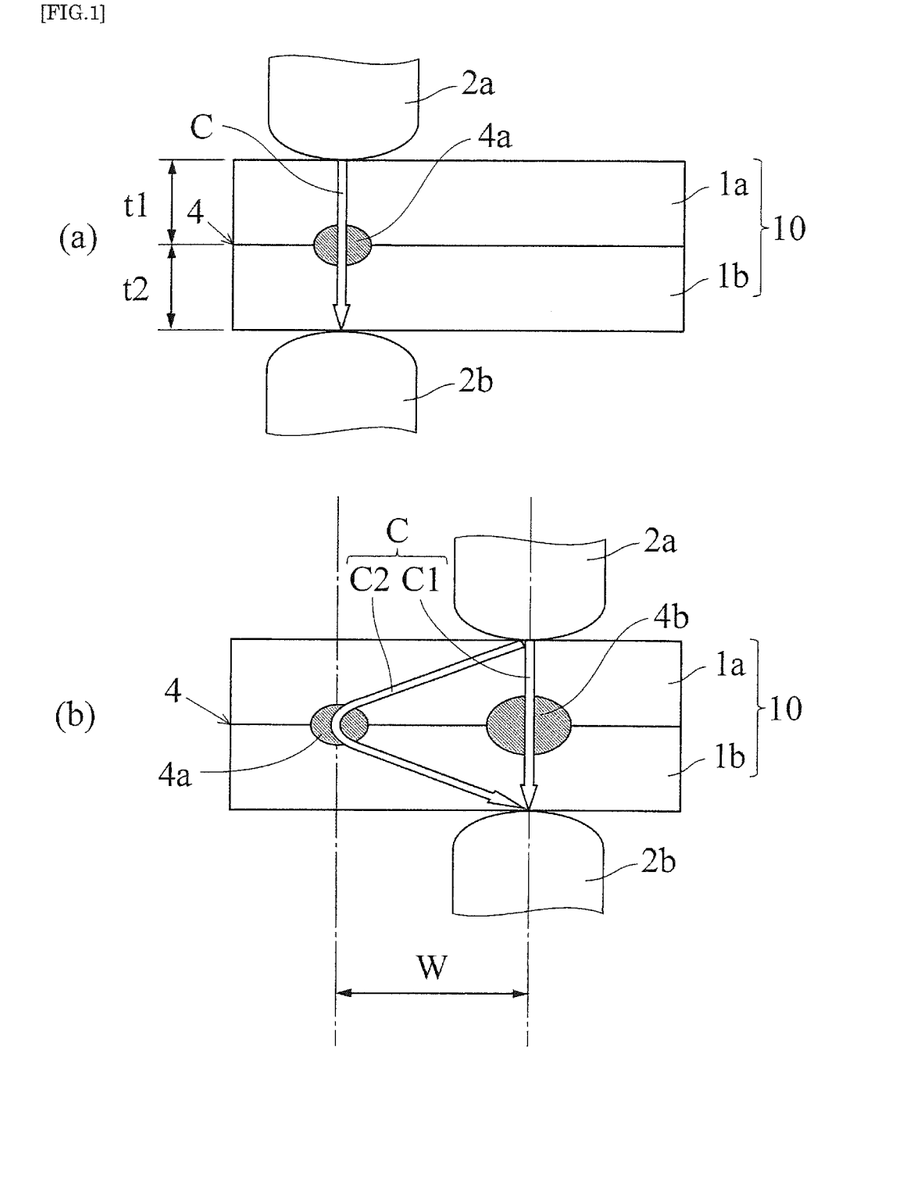
FIG. 1 is a diagram illustrating a resistance spot welding method according to an embodiment of the present invention.

FIG. 1 is a diagram illustrating a resistance spot welding method according to an embodiment of the present invention, with FIG. 1(a) being a conceptual diagram showing a preliminary step and FIG. 1(b) being a conceptual diagram showing a welding step. As shown in FIG. 1(a), in the preliminary step of the resistance spot welding method according to the present embodiment, first, an overlapped body 10 composed of a first steel plate 1a (hereinafter referred to as "steel plate 1a") having a thickness t1 and a second steel plate 1b (hereinafter referred to as "steel plate 1b") having a thickness t2 is sandwiched by a pair of electrodes 2a and 2b of a welder. The electrodes 2a and 2b are disposed so as to oppose to each other. Then, energization (see a solid white arrow C) is performed across the electrodes 2a and 2b so as to perform resistance spot welding. Through the preliminary step, an energization point 4a is formed at an interface 4 (hereinafter referred to as "steel plate interface 4") between the steel plates 1a and 1b. In the present embodiment, a molten pool is formed as the energization point 4a. As the electrodes 2a and 2b, for example, DR-type electrodes (DR40) having a tip diameter of 6 mm can be used.

Next, as shown in FIG. 1(b), as a welding step, spot welding is performed by performing energization (see a solid white arrow C) across the electrodes 2a and 2b such that a molten pool 4b is formed at a position away in the horizontal direction from the energization point 4a by a distance W. At this time, a welding current C is branched between the electrodes 2a and 2b, and a part of the welding current C flows through the energization point 4a (see a solid white arrow C2, C2=C−C1). To be specific, a current C1 traveling from the electrode 2a directly to the electrode 2b and a current C2 traveling from the electrode 2a through the energization point 4a to the electrode 2b flow between the electrodes 2a and 2b. At this time, the molten pool 4b is formed, by the current C1, at the steel plate interface 4 located between the electrodes 2a and 2b, and the steel plates 1a and 1b are joined.

As a result of a part (current C2) of the welding current C passing through the energization point 4a between the electrodes 2a and 2b as described above, heat generation near the molten pool 4b can be facilitated, and the steel plates 1a and 1b near the molten pool 4b can be softened. For example, even in the case where the steel plates 1a and 1b are high-strength steel plates, the hardness of the steel plates 1a and 1b near the molten pool 4b can be lowered to a hardness similar to that of mild steel during welding. Consequently, the steel plate interface 4 near the molten pool 4b can be softened. To rephrase it, the conformance of the steel plate interface 4 near the molten pool 4b can be improved (contact area can be enlarged). Accordingly, it is possible to suppress the generation of the expulsion and surface flash at the time of welding steel plates while forming the molten pool 4b having a sufficiently large size. In addition, according to the present embodiment, it is possible to form the energization point 4a by spot welding by the electrodes 2a and 2b. Accordingly, it is unnecessary to provide a separate member (for example, an indenter or the like) for forming the energization point 4a. That is, with the resistance spot welding method according to the present embodiment, the molten pool 4b having a sufficient size can be formed while suppressing the generation of the expulsion and surface flash at the time of welding steel plates without changing the welding pressure and/or the amount of energization used at the time of welding twice or more during welding and without making the structure of the welder complex. Also, the generation of the expulsion and surface flash during welding is suppressed, and thus the upper limit current (the maximum value of a welding current that can provide a sound nugget without causing the expulsion and surface flash) can be set sufficiently larger than the lower limit current (the minimum value of the welding current). In other words, a proper current range can be attained sufficiently.

In the present embodiment, the molten pool 4b is formed at a position at a horizontal distance W of 20 mm or less from the energization point 4a (the distance between the center of the energization point and the center of the molten pool). By setting the distance W in this way, heat generation near the molten pool 4b can be sufficiently facilitated, and the steel plates 1a and 1b can be efficiently softened near the molten pool 4b.

In order to efficiently soften the steel plates 1a and 1b near the molten pool 4b, it is preferable to form the molten pool 4b at a position at a horizontal distance W of 15 mm or less from the energization point 4a. However, if the distance W is too short, the current C2 flowing through the energization point 4a will be excessively large and the molten pool 4b will be small. Accordingly, the horizontal distance W is preferably set to 10 mm or more.

The welding conditions are adjusted as appropriate according to the thickness, strength and the like of the steel plates 1a and 1b. If the steel plates 1a and 1b are 1.4 mm thick high-tensile strength steel plates of 590 MPa grade, for example, in the preliminary step, the pressing force (welding pressure) of the electrodes 2a and 2b is set to 3.5 kN, the welding current C flowing across the electrodes 2a and 2b is set to 3.0 kA to 4.0 kA, the energization time is set to 16 cycles (267 msec), and the retention time after energization is set to 10 cycles (167 msec). Likewise, in the welding step, the pressing force (welding pressure) of the electrodes 2a and 2b is set to 3.5 kN, the welding current C flowing across the electrodes 2a and 2b is set to 5.9 kA to 9.4 kA, the energization time is set to 16 cycles (267 msec), and the retention time is set to 10 cycles (167 msec).

The diameter of the energization point 4a may be smaller or larger than the diameter required for the molten pool 4b from the design point of view (for example, $4\sqrt{t}$, where t is the thickness (mm) of the thinner one of the two steel plates constituting a plate combination). However, if the energization point 4a is too small, the influence of so-called "constriction resistance" will be large, and a branch current flowing through the energization point 4a may not be obtained sufficiently. For this reason, the diameter of the energization point 4a is preferably set to 1 mm or more.

If resistance spot welding is repeated, as a subsequent step following the welding step described above, as shown in FIG. 2, spot welding can be performed by using, as an energization point, the molten pool 4b that has already been formed without forming a new energization point. To be specific, the electrodes 2a and 2b are disposed and energized such that a new molten pool 4c is formed at a position at a horizontal distance W of 20 mm or less (preferably 10 mm or more and 15 mm or less) from the molten pool 4b. In this case, a part (current C2) of the welding current C flows through the molten pool 4b located between the electrodes 2a and 2b, and thus heat generation near the molten pool 4c can be facilitated, and the steel plates 1a and 1b near the molten pool 4c can be softened. It is thereby possible to reduce the contact resistance at the steel plate interface 4 near the molten pool 4c and prevent heat generation in the molten pool 4c from being excessively large. As a result, the generation of the expulsion and surface flash at the time of welding steel plates can be prevented. In the subsequent step, spot welding can be further performed by using the molten pool 4c as an energization point so as to form a new molten pool (not shown) at a position at a horizontal distance W of 20 mm or less (preferably, 10 mm or more and 15 mm or less) from the molten pool 4c. In the manner as described above, a plurality of molten pools can be consecutively formed. For example, the automotive structural member shown in FIG. 4 can be produced by repeating resistance spot welding at a position within a range of 20 mm from a molten pool formed earlier. In the subsequent step, by using the energization point 4a that has already been formed, new molten pools may be formed consecutively around the energization point 4a. It is also possible to repeat resistance spot welding while forming a new energization point 4a, without executing the subsequent step.

In the embodiment described above, a description has been given of an example of forming the energization point 4a at which the interface is fusion joined, but it is also possible to form an energization point at which the interface is not fused and is thus in a press contact state. In the case of forming the energization point in a press contact state as well, it is preferable to set the diameter of the energization point to 1 mm or more as with the energization point 4a described above. To rephrase it, it is preferable that the size of a press contact portion between the steel plate 1a and the steel plate 1b (the portion serving as an energization point at the steel plate interface) is a size corresponding to a circle having a diameter of 1 mm or more.

<Reference Example>

Figure 3:
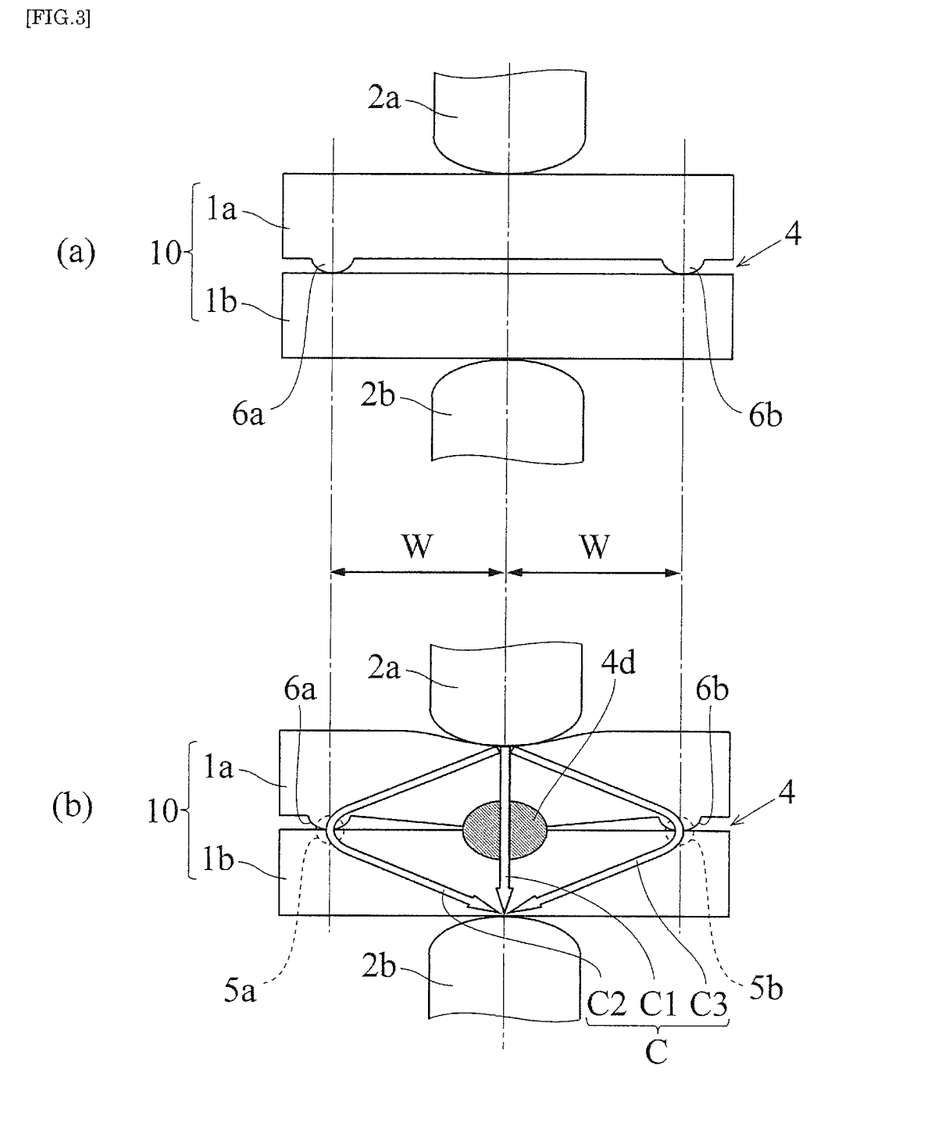
FIG. 3 is a diagram illustrating a resistance spot welding method according to a reference example.

Hereinafter, another example of a resistance spot welding method for joining a plate combination by forming energization points, which is different from the embodiment of the present invention, will be described as a reference example. FIG. 3 is a diagram illustrating a resistance spot welding method according to the reference example. In the reference example, for example, as shown in FIG. 3(a), a pair of protruding portions 6a and 6b are provided on the underside of a steel plate 1a, and an overlapped body 10 is sandwiched by electrodes 2a and 2b, with the protruding portions 6a and 6b being in contact with the upper surface of a steel plate 1b. Next, as shown in FIG. 3(b), as a preliminary step, the overlapped body 10 is pressed by the pair of electrodes 2a and 2b, and as a welding step, energization (see a solid white arrow C) is performed across the electrodes 2a and 2b while the overlapped body 10 is pressed by the electrodes 2a and 2b so as to form a molten pool 4d at a steel plate interface 4. In this way, the steel plates 1a and 1b can be joined.

In the reference example, the protruding portions 6a and 6b are brought into press contact with the steel plate 1b, and thus energization points 5a and 5b are formed at contact portions between the protruding portions 6a and 6b and the steel plate 1b. As a result, a welding current C is branched between the electrodes 2a and 2b, and a part (see solid white arrows C2 and C3) of the welding current C flows through the energization points 5a and 5b. To be specific, a current C1 traveling from the electrode 2a directly to the electrode 2b, a current C2 traveling from the electrode 2a through the energization point 5a to the electrode 2b, and a current C3 traveling from the electrode 2a through the energization point 5b to the electrode 2b flow between the electrodes 2a and 2b. The currents C2 and C3 flow through the energization points 5a and 5b as described above, and thus heat generation near the molten pool 4d can be facilitated, and the steel plates 1a and 1b near the molten pool 4d can be softened. It is thereby possible to reduce the contact resistance at the steel plate interface 4 near the molten pool 4d and prevent heat generation in the molten pool 4d from being excessively large. As a result, it is possible to form the molten pool 4d having a sufficiently large size while suppressing the generation of the expulsion and surface flash at the time of welding steel plates. In the reference example as well, by executing a subsequent step as described above, spot welding can be performed consecutively in an area in which the protruding portions 6a and 6b are not formed.

Figure 2:
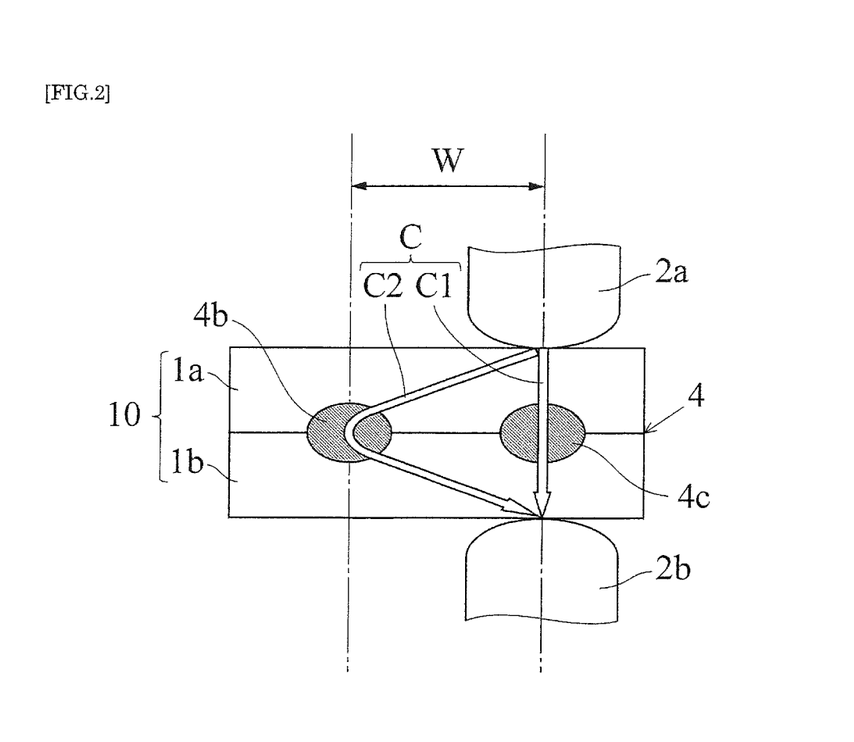
FIG. 2 is a diagram illustrating the resistance spot welding method according to an embodiment of the present invention.

In the reference example as well, the horizontal distance W between the energization point 5a, 5b and the molten pool 4d (the distance between the center of the energization point and the center of the molten pool) is set to 20 mm or less, as with the resistance spot welding method described with reference to FIGS. 1 and 2. By setting the distance W in this way, heat generation near the molten pool 4d can be sufficiently facilitated, and the steel plates 1a and 1b near the molten pool 4d can be efficiently softened. In the reference example, a horizontal distance between an axis of the electrodes 2a and 2b and a tip portion (a contact portion in contact with the steel plate 1b) of the protruding portion 6a and a horizontal distance between the axis of the electrodes 2a and 2b and a tip portion (a contact portion in contact with the steel plate 1b) of the protruding portion 6b are set to 20 mm or less. The molten pool 4d is preferably formed at a position at a horizontal distance W of 10 mm or more and 15 mm or less from the energization point 5a, 5b.

The reference example given above has been described taking an example in which the protruding portions 6a and 6b are provided on the steel plate 1a, but it is sufficient that the protruding portions are provided on at least one steel plate. Accordingly, the protruding portions may be provided on the steel plate 1b, instead of the steel plate 1a. The protruding portions may also be provided on the steel plates 1a and 1b. The number of protruding portions is not limited to that used in the above-described example. It is possible to provide only one protruding portion, or provide three or more protruding portions.

The press contact state of the press contact portions of the protruding portions 6a and 6b with respect to the steel plate 1b may be changed to a fusion joined state during welding. In this case as well, the function of the energization points 5a and 5b is maintained. Also, instead of the protruding portions 6a and 6b, spacers having the same size as the protruding portions 6a and 6b may be disposed and brought into press contact with the steel plates 1a and 1b so as to form energization points.

The resistance spot welding method according to the present invention is suitable for use in welding an overlapped body that is composed of two high-tensile strength steel plates and that satisfies the equation (i) given above, and also suitable for use in welding an overlapped body (for example, automotive steel plate) that is composed of a mild steel plate and a high-tensile strength steel plate and that satisfies the equation (i) given above.

overlapped body was also measured. Table 1 below shows the configuration of each overlapped body, welding conditions and the measured results of the proper current range. Note that the proper current ranges under various conditions shown in Table 1 are normalized with the proper current range obtained at the time of single-point welding being set to 1.00. In this example, it was decided that a sufficient proper current range was attained when the proper current range was increased by 20% or more with respect to that obtained at the time of single-point welding.

TABLE 1

| | Overlapped body | | | | | Welding conditions | | | | | | |
|---|---|---|---|---|---|---|---|---|---|---|---|---|
| | First steel plate | | Second steel plate | | | Single-point welding | | | Welding with preliminary step | | | |
| | | | | | | | | | | Preliminary step | | |
| No. | Tensile strength (MPa) | Thickness (mm) | Tensile strength (MPa) | Thickness (mm) | Left side value in equation (i) | Welding pressure (kN) | Energization time (msec) | Retention time (msec) | Welding pressure (kN) | Current value (kA) | Energization time (msec) | Retention time (msec) |
| 1 | 440 | 1.4 | 440 | 1.4 | 440 | 2.94 | 267 | 167 | 2.94 | 4.4 | 267 | 167 |
| 2 | 590 | 1.4 | 590 | 1.4 | 590 | 3.50 | 267 | 167 | 3.50 | 4.0 | 267 | 167 |
| 3 | 780 | 1.2 | 780 | 1.2 | 780 | 3.50 | 233 | 167 | 3.50 | 5.0 | 233 | 167 |
| 4 | 1180 | 1.6 | 1180 | 1.6 | 1180 | 3.43 | 333 | 167 | 3.43 | 4.5 | 333 | 167 |

| | Welding conditions Welding with preliminary step Welding step | | Proper current range (normalized value) | | | | |
|---|---|---|---|---|---|---|---|
| | | Retention | | Welding with preliminary step | | | |
| No. | Energization time (msec) | time (msec) | Single point welding | W = 15 (mm) | W = 20 (mm) | W = 25 (mm) | W = 30 (mm) |
| 1 | 267 | 167 | 1.00 | 1.50 | 1.30 | *1.15 | *1.05 |
| 2 | 267 | 167 | 1.00 | 1.30 | 1.25 | *1.10 | *1.00 |
| 3 | 233 | 167 | 1.00 | 1.25 | 1.20 | *1.05 | *1.00 |
| 4 | 333 | 167 | 1.00 | 1.25 | 1.20 | *1.10 | *1.00 |

Asterisks (*) indicate that the proper current range required by the present invention was not attained.

EXAMPLES

In order to verify the effects of the present invention, overlapped bodies having various configurations were prepared, resistance spot welding was performed by using the method described with reference to FIG. 1, and a range of current value (proper current range) that can form a molten pool having a sufficiently large size without generating the expulsion and surface flash was measured. As the electrodes 2a and 2b, DR-type electrodes (DR40) having a tip diameter of 6 mm were used. In the following description, "molten pool having a sufficiently large size" refers to a molten pool having a nugget diameter of 4√t (mm) or more (where t is the minimum value (mm) among the thickness of the first steel plate and the thickness of the second steel plate).

In this example, as shown in Table 1 given below, four different types of overlapped bodies (overlapped bodies Nos. 1 to 4) having different values on the left side of the equation (i) given above were prepared. Then, resistance spot welding was performed on each overlapped body by setting the distance W (see FIGS. 1(b)) to 15 mm, 20 mm, 25 mm and 30 mm, and the proper current range was measured. In addition, the proper current range when single-point welding (conventional resistance spot welding without performing preliminary welding) was performed on each As shown in Table 1, in the overlapped bodies, by setting the distance W between energization point and molten pool to 20 mm or less, the proper current range was increased by 20% or more with respect to that obtained at the time of single-point welding. It can be seen from this that according to the present invention, one of the features of which is to set the distance between energization point and molten pool to 20 mm or less, the proper current range can be sufficiently increased with respect to that obtained at the time of single-point welding. That is, it can be seen that according to the present invention, it is possible to easily faun a molten pool having a sufficiently large size while suppressing the generation of the expulsion and surface flash.

In the examples described above, a single energization method is used as an energization condition, but the energization condition of the resistance spot welding method according to the present invention is not limited to a single-stage energization method. Also, the plate combinations (overlapped bodies) in which the present invention is applied are not limited to plate combinations composed only of high-tensile strength steel plates. That is, according to the present invention, the effect of increasing the proper current range can be obtained in any plate combination that satisfies the equation (i) given above.

INDUSTRIAL APPLICABILITY

According to the present invention, when resistance spot welding is performed on an overlapped body composed of two steel plates, it is possible to sufficiently attain a proper current range without changing the welding pressure and/or the amount of energization used at the time of welding twice or more during welding and without making the structure of the welder complex. Accordingly, the present invention is optimal in resistance spot welding for producing a plate combination in which two steel plates are overlapped, in particular an automotive structural member.

DESCRIPTION OF REFERENCE SIGNS 1a, 1b Steel plate
2a, 2b Electrode
4 Steel plate interface
4a, 5a, 5b Energization point
4b, 4c, 4d Molten pool
6a, 6b Protruding portion
10 Overlapped body
20 Pillar
21 Overlapped body
22 Flange
23 Weld portion
C Welding current
C1, C2, C3 Current
W Distance between energization point and molten pool
t1, t2 Thickness of steel plate

The invention claimed is:

1. A resistance spot welding method in which an overlapped body that consists of a first steel plate and a second steel plate and that satisfies the following equation (i) is energized while being sandwiched and pressed by a pair of electrodes so as to form a molten pool at an interface between the steel plates and thereby to join the steel plates, the method comprising:

a preliminary step of forming an energization point at the interface between the steel plates by energizing the overlapped body while sandwiching and pressing the overlapped body by the pair of electrodes; and a welding step of performing spot welding so as to form the molten pool at a position at a horizontal distance of 10 to 20 mm from the energization point under a condition in which a branch current flows through the energization point, wherein a first portion of the first steel plate between the energization point and the molten pool and a second portion of the second steel plate between the energization point and the molten pool are solid, and further wherein performing the spot welding at the horizontal distance of 10 to 20 mm from the energization point allows a 20% or more increase in the proper current range with respect to that obtained at the time of single-point welding, $$(TS1 \times t1 + TS2 \times t2)/(t1 + t2) \geq 440 \ldots \quad (i)$$

where TS1 represents a tensile strength (MPa) of the first steel plate, t1 represents a thickness (mm) of the first steel plate, TS2 represents a tensile strength (MPa) of the second steel plate, and t2 represents a thickness (mm) of the second steel plate.

2. The resistance spot welding method according to claim 1, further comprising a subsequent step of repeatedly performing spot welding such that a new molten pool is formed at a position at a horizontal distance of 10 to 20 mm from the energization point or the molten pool.

3. A welded structure obtained by the method according to claim 1.

4. A welded structure obtained by the method according to claim 2.

* * * * *